United States Patent [19]

Palardy

[11] Patent Number: 5,776,535
[45] Date of Patent: Jul. 7, 1998

[54] TREATMENTS TO REDUCE MOISTURE IN THE DEWATERING OF GRAIN-BASED CELLULOSIC MATERIALS

[75] Inventor: William J. Palardy, Chalfont, Pa.

[73] Assignee: BetzDearborn Inc., Trevose, Pa.

[21] Appl. No.: 734,428

[22] Filed: Oct. 16, 1996

[51] Int. Cl.⁶ ........................................ A23L 1/015
[52] U.S. Cl. ................ 426/618; 426/429; 426/430; 426/507
[58] Field of Search ........................ 426/618, 429, 426/430, 507

[56] References Cited

U.S. PATENT DOCUMENTS

| | | | |
|---|---|---|---|
| 3,928,631 | 12/1975 | Freeman et al. | 426/18 |
| 4,384,010 | 5/1983 | Bermudez | 426/618 |
| 5,283,322 | 2/1994 | Martin et al. | 530/374 |
| 5,536,326 | 7/1996 | Stocker | 127/67 |

*Primary Examiner*—Helen Pratt
*Attorney, Agent, or Firm*—Alexander D. Ricci; Richard A. Paikoff

[57] ABSTRACT

A method of reducing the moisture content of an aqueous stream containing corn fiber during the removal of water from the corn fiber is disclosed, which comprises adding to the stream an effective amount of a polyglycerol ester surfactant.

10 Claims, No Drawings

TREATMENTS TO REDUCE MOISTURE IN THE DEWATERING OF GRAIN-BASED CELLULOSIC MATERIALS

BACKGROUND OF THE INVENTION

The wet milling of corn makes available four principal products: starch, gluten feed, gluten meal, and oil. The purpose of the wet milling process in general is to separate starch and oil in pure form for food use, to isolate a large percentage of the protein in a concentrated form (gluten meal) for food or feed use, and to combine residual fibrous and soluble fractions to produce a feed ingredient (gluten feed) of about 21% protein content. (A complete description of the milling process may be found in the Kirk-Othmer Encyclopedia of Chemical Technology, 3rd Edition, Volume 21, pages 492–507, 1983).

The several steps of the wet milling process include first passing the corn kernels through mechanical cleaners designed to separate unwanted substances such as pieces of cob, sticks, husks, metal and stone, then soaking (steeping) the corn for 24 to 48 hours in circulating warm water containing a small amount of sulfur dioxide to inhibit putrefactive fermentation and facilitate softening. The kernels swell appreciably in the steeping; when fully softened they contain 40% to 50% moisture, their hulls are somewhat loosened, and they are ready for much easier separation of their component parts than would be possible otherwise.

The softened kernels are then degerminated by a milling action in which the rotary action of one plate pressing the kernel against a similar, stationary plate tears the soft kernel apart to free the rubbery germ without crushing it and with concomitant liberation of a portion of the starch and protein from the endosperm. The germs, being lighter than the other parts of the kernels, float to the surface of the aqueous mixture where they may be skimmed off or, in the case of modern wet milling plants, separated by hydroclones.

This leaves an aqueous slurry of starch, gluten, fiber and chunks of the softened starchy endosperm. Excess water and much of the free starch and protein that were liberated coincident with degermination are separated by screening; the remaining mixture of endosperm chunks and fibrous materials is ground or impacted to a fine mash and washed on a series of screens to retain the fibrous material and hard proteinaceous endosperm particles that resist comminution; the starch and gluten pass through the screen of metal or fabric composition which retains the fibrous and proteinaceous material of largest particle size.

This now leaves only the starch and gluten as an aqueous slurry. The slurry is pumped from the shakers to high speed centrifugal machines. Because of the difference in specific gravity, the relatively heavier starch is easily separated from the lighter gluten by centrifugal force, yielding a gluten fraction and a starch fraction.

Obviously, the various fractions above must be further processed so as to provide the corn wet milling products which are available in today's market. The fiber fraction and gluten fraction are obtained from the main slurry stream of the wet milling process as separated aqueous slurries which are to be dewatered. This water is subsequently removed via mechanical and thermal processes to achieve the desired moisture content of the final products.

In the case of the fibrous fraction, screw presses are predominantly used to reduce the moisture content of the fiber, from approximately 88% moisture to 60% moisture. The remaining water is then removed thermally in a direct contact hot air dryer to achieve a final moisture content of approximately 10%. Since dryer efficiencies are typically on the order of about 60% (i.e., about 1600 BTU is required for each pound of water evaporated), this drying step is a significant energy consumer in the wet milling process.

The moisture content of the solids as they exit the mechanical dewatering process is limited by physical conditions (e.g., nature of the solids, drainage time available, machine compression ratio, etc.). The additives of the present invention allow the solids to be discharged below these moisture limitations, and the resulting reduced moisture load on the subsequent thermal drying processes yields a corresponding reduction in plant energy costs.

DETAILED DESCRIPTION OF THE INVENTION

The present invention relates to a method for enhancing the dewatering of corn fiber during the wet milling of corn which comprises adding to an aqueous fiber solution, prior to dewatering, an effective dewatering amount of a nonionic surfactant. In a preferred embodiment of the present invention, the nonionic surfactant is a polyglycerol ester or polyethylene glycol ester, with a hexaglycerol tetraoleate being particularly preferred.

It has been discovered that adding this treatment to a fiber stream enhances the efficacy of the mechanical dewatering process, reducing the fiber press discharge cake moisture content, and consequently reducing the energy requirements for the thermal drying process. The treatment of the present invention is effective at dosages of at least about 100 ppm (based on actives and total mass of the fiber slurry), with treatment levels of from about 100–2000 ppm preferred.

The following tests were conducted using process samples provided by a corn wet milling facility. Samples included the fiber stream exiting from the final stage of the fiber washing process before the fiber mechanical dewatering process.

Initial testing was performed using the Capillary Suction Test (CST, Venture Innovations, Inc.), which is frequently used as a preliminary screening tool for assessing treatments which improve the free drainage of water from waste sludge. Results from the screening test indicate that citric acid, alum, and treatments containing alum yielded the lowest "start" and "suction" times, indicating that these materials are effective in improving the free drainage of the corn fiber slurry. This test did not have the ability to determine the effect of treatments on the press effluent cake moisture, and was used solely to identify some treatments to be subsequently tested in the laboratory dewatering press.

The laboratory apparatus used to simulate the mechanical dewatering press is made up of a pneumatic piston which compresses the contents of a filter container against a screened drainage area in the bottom of the container. The force with which the cylinder compresses the sample is adjusted by regulating the air pressure supplied to the cylinder.

The experiments consisted of placing the fiber sample into the filter container. The sample was allowed to freely drain while measuring the cumulative filtrate collected. The cylinder was then activated and the sample was pressed at approximately 15 psig (applied pressure). The filtrate accumulated during this press period was regularly recorded. Both of the filtrates ("free drain" and "press") and the final cake were analyzed for dry substance content (% dry solids) using a standard oven method.

Experimental results are shown in Table 1. The primary basis for differentiating treatment performance was cake moisture. Other factors considered in evaluating the treatments were free drainage filtrate and total filtrate (each expressed as % of initial slurry charge), filtrate % dry solids, and filtrate turbidity.

In accordance with the present invention, the most effective corn wet milling fiber dewatering aids are polyglycerol esters of fatty acids. Several different degrees of polymerization (from d.p.=3 to 10) and degrees of esterification (from d.e.=1 to 10) were tested, all of which appeared to have efficacy in reducing the final cake moisture of the fiber.

TABLE I

Laboratory Press Results - Polyglycerol Esters

| Polyglycerol Ester Surfactant of | Degree of Polymerization | Degree of Ethoxylation | Dosage (ppm) | Cake % Moisture (control less treated) |
|---|---|---|---|---|
| Oleic Acid | 6 | 4 | 50 | –.02 |
|  |  |  | 100 | 1.5 |
|  |  |  | 500 | 2.1 |
|  |  |  | 2000 | 2.5 |
| Oleic Acid | 3 | 1 | 25 | 0.9 |
|  |  |  | 50 | 1.8 |
|  |  |  | 100 | 1.6 |
|  |  |  | 250 | 2.1 |
| Lauric Acid | 3 | 1 | 100 | 1.6 |
| Oleic Acid | 10 | 6 | 100 | 1.5 |

In a particularly preferred embodiment of the present invention, a hexaglycerol tetraoleate was found to be most effective in reducing the final cake moisture of the fiber. As shown in Table II, dosage rates of 50 ppm or less are ineffective in laboratory testing, while dosages of 100 ppm or more reduce the final fiber cake moisture by at least 1.5% (control averaged 64.8% moisture).

TABLE II

Hexaglycerol Tetraoleate Dosage Study

| Dosage (ppm active)[1] | Cake % Moisture (control less treated) |
|---|---|
| 25 | (0.9) |
| 50 | (0.2) |
| 100 | 1.5 |
| 250 | 1.2 |
| 500 | 2.1 |

[1]Based on total mass of slurry

Also in accordance with the present invention, it was discovered that polyethylene glycol esters of fatty acids are effective in improving the mechanical dewatering of wet milling fiber.

TABLE III

Polyethylene Glycol Esters of Fatty Acids

| Material | Dosage ppm | Cake % Moisture Reduction (control less treated) |
|---|---|---|
| blend of polyethylene glycol (molecular weight 600) di-oleate and polyethylene glycol (molecular weight 400) di-oleate | 100 | 0.27% |
| blend of polyethylene glycol (molecular weight 600) di-oleate and polyethylene glycol (molecular weight 400) di-oleate | 200 | 0.00% |
| diethylene glycol oleate | 100 | 1.33% |
| diethylene glycol oleate | 500 | 2.08% |
| glycerol mono-oleate | 500 | 0.89% |

It is expected that these treatments will also be effective in dewatering the germ stream in the corn wet milling process.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. A method for enhancing mechanical dewatering of wet corn milling fiber comprising adding to said wet fiber, prior to mechanical dewatering, an effective dewatering amount of a polyglycerol ester surfactant.

2. The method as recited in claim 1 wherein at least about 100 ppm of the surfactant is added to the aqueous solution.

3. The method as recited in claim 2 wherein from about 100–2000 ppm of the surfactant is added to the aqueous solution.

4. The method as recited in claim 1 wherein the removal of water from the corn fiber is by screw presses.

5. The method as recited in claim 1 wherein the polyglycerol ester is a hexaglycerol tetraoleate.

6. A method for enhancing mechanical dewatering of wet corn milling fiber comprising adding to said wet fiber, prior to mechanical dewatering, an effective dewatering amount of a polyethylene glycol ester surfactant.

7. The method as recited in claim 6 wherein at least about 100 ppm of the surfactant is added to the aqueous solution.

8. The method as recited in claim 7 wherein from about 100–2000 ppm of the surfactant is added to the aqueous solution.

9. The method as recited in claim 6 wherein the removal of water from the corn fiber is by screw presses.

10. The method as recited in claim 6 wherein the polyethylene glycol ester is a diethylene glycol oleate.

* * * * *